Figure 1:
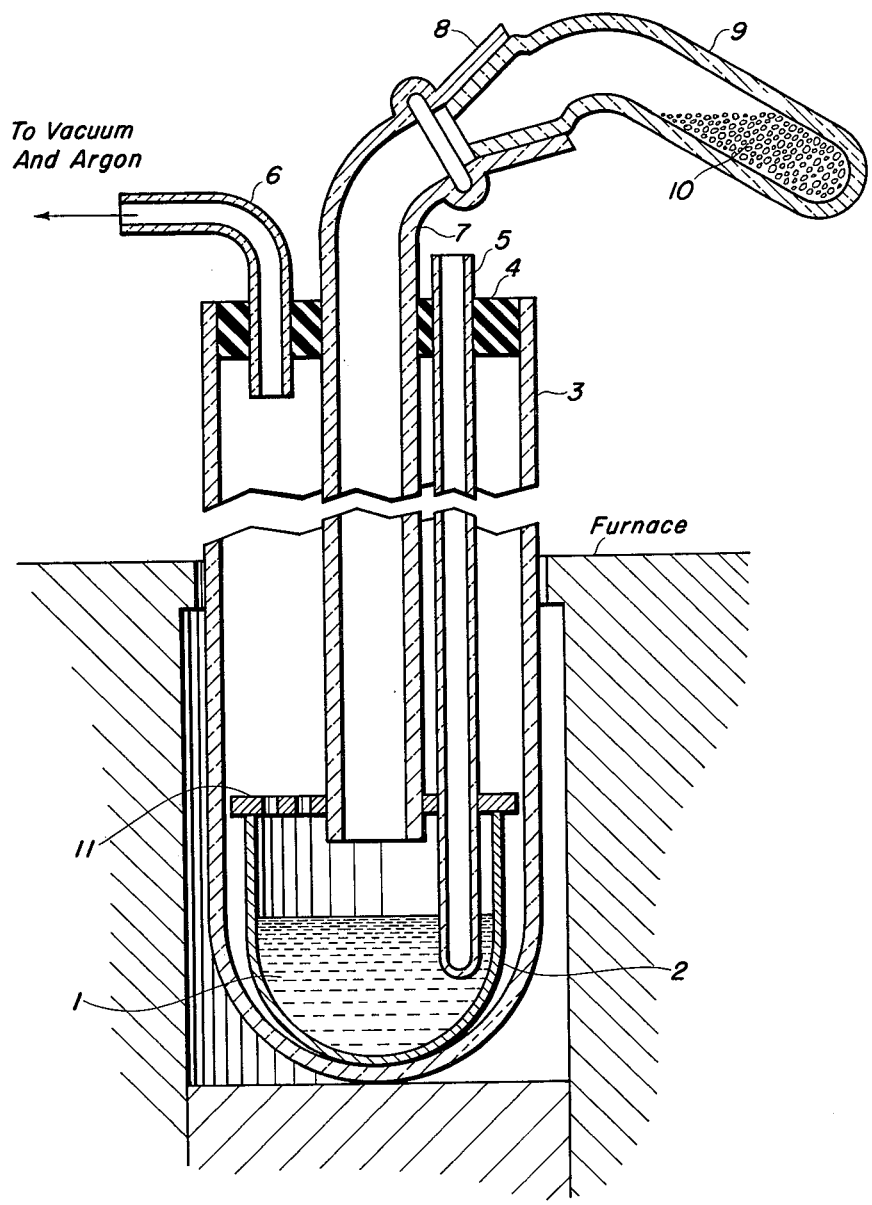

United States Patent Office 3,049,423
Patented Aug. 14, 1962

3,049,423
METHOD FOR OBTAINING PLUTONIUM METAL FROM ITS TRICHLORIDE
James G. Reavis, Joseph A. Leary, and William J. Maraman, Los Alamos, N. Mex., assignors to the United States of America as represented by the United States Atomic Energy Commission
Filed June 16, 1959, Ser. No. 820,836
13 Claims. (Cl. 75—84.1)

The present invention relates to methods for obtaining plutonium metal by the direct reduction of plutonium halides, and is more particularly concerned with such methods wherein a reducing metal which forms a chloride having a more negative standard free energy of formation than that of plutonium trichloride is used to reduce such plutonium trichloride. It is also within the scope of the present invention to perform such reductions with a reducing metal which does not appreciably reduce certain contaminating halides which may be present.

The standard prior art method for obtaining plutonium by a reduction of its halides consists in the calcium reduction of plutonium tetrafluoride in the presence of iodine, as set forth in the co-pending application of Baker, S.N. 161,147, filed May 10, 1950, now Patent No. 2,890,110, and also assigned to the United States of America as represented by the Atomic Energy Commission. Advantage is taken of the exothermic reaction between iodine and calcium to limit the heat required from external heat sources to that required to initiate the calcium reduction of the fluoride, the reactions thereafter being self-sustaining, and an excess of calcium over that required for both the reduction of the PuF$_4$ and the iodide formation is used to push the reactions in the desired direction and thereby increase the yield. The exothermic heat of both reactions is also useful in keeping the plutonium and the slag in a molten condition for their ready separation.

The Baker process has come to be known as the "bomb" process because the reactions are necessarily conducted inside a heavy sealed metal container. The container must be evacuated, filled with argon and sealed after charging at room temperature to prevent oxidation of the reactants. The argon also reduces the extent to which the iodine penetrates the pores of the refractory liner inside the metal container. The container must have a heavy wall because high internal pressures are developed during the process, even before the other reactants combine with iodine. At 260° C., for example, probably all the iodine has been volatilized to create a partial pressure of about 6 atmospheres. As the temperature inside the container increases, further pressure increases are brought about by simple heating of both the iodine vapor and the argon. The free volume inside the container must be kept to a minimum to confine the iodine to the reaction zone, and thus the high pressures cannot be avoided by increasing the volume of the container.

Thus the only practicable bomb process is that in which the solid dry reactants are charged into the bomb at room temperature with a small free volume in the space above the charge. The bomb is sealed with a gasketed and bolted cover plate, the air in the free volume is replaced with argon, and the charge is heated by an induction coil. After a few minutes, the temperature inside the reaction vessel begins to rise rapidly, induction heating is discontinued and the reaction is allowed to proceed at its own pace. After a rapid rise to a maximum temperature somewhere in the range of 1000 to 1600° C., the contents of the vessel are allowed to cool to room temperature. The bomb is opened to yield a solid plutonium button at the bottom and a solidified CaF$_2$—CaI$_2$ slag at the top.

The principal disadvantages of the bomb process as outlined above are that (1) it requires the use of iodine and extra calcium; (2) it is essentially a high pressure process and requires a thick-walled reaction vessel and (3) it is not amenable to continuous or semi-continuous operation, but is strictly a batch type operation. It is an object of the present invention to provide a process for obtaining plutonium metal through the reduction of plutonium halides which does not have such disadvantages.

Another object of the present invention is to provide methods and means for obtaining pure plutonium metal in high yield by reduction of the halides of plutonium without the use of booster reactants to provide a concurrent heat liberating reaction.

A further object is to provide such methods and means for obtaining plutonium metal wherein the pressure in the reaction vessel is never appreciably greater than that of the surrounding atmosphere.

An additional object is to provide such methods and means in which the reaction vessel will contain the resulting reaction products in the molten solid states but has walls of a thickness not necessarily greater than that required for reactions at atmospheric pressure.

Another and further object is to provide such methods and means in which the products may be withdrawn continuously or semi-continuously, i.e., complete shutdown is not required except momentarily and/or after a long period of operation.

An additional object is to provide such methods and means wherein substantially pure plutonium metal is obtained from a plutonium halide contaminated with like halides of fission product elements, the bulk of the latter halides appearing in the slag.

The above and other objects are attained in the present invention by the direct reduction of plutonium trichloride (PuCl$_3$) with any one of several metals in a heated container filled with an inert gas initially at a pressure somewhat less than atmospheric. The salt is melted under such pressure, after which the inert gas pressure is increased to about an atmosphere. The reductant is then added gradually, and the temperature is increased while maintaining the inert gas pressure at about an atmosphere. A non-reacting halide such as NaCl may be added with the PuCl$_3$ to serve as a flux, i.e., to reduce the melting point of the resulting salt slag below its undiluted value of 772° C. (CaCl$_2$) or 870° C. (LaCl$_3$). An alternate method of avoiding high pressures without volatilization or air leakage into the reaction vessel is to maintain the inert gas at a pressure slightly greater than that of the surrounding atmosphere and to allow gas to leak from the vessel at a rate sufficient to prevent any appreciable increase in pressure.

Figure 2:
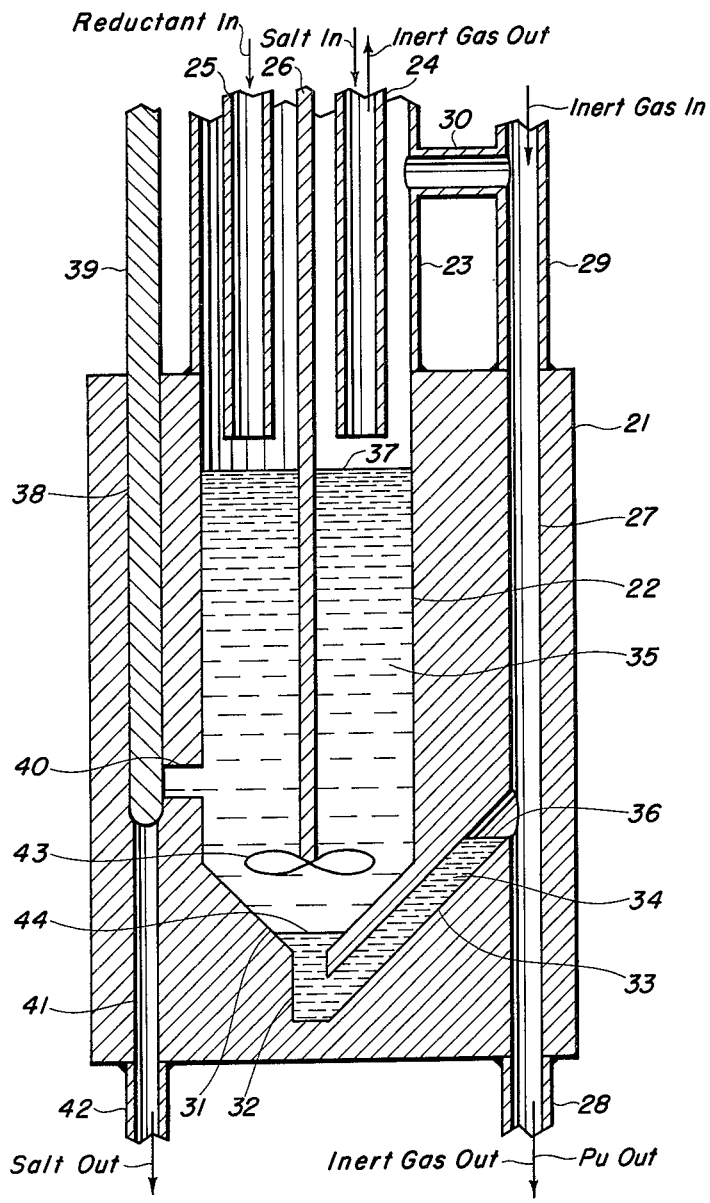
Figure 3:
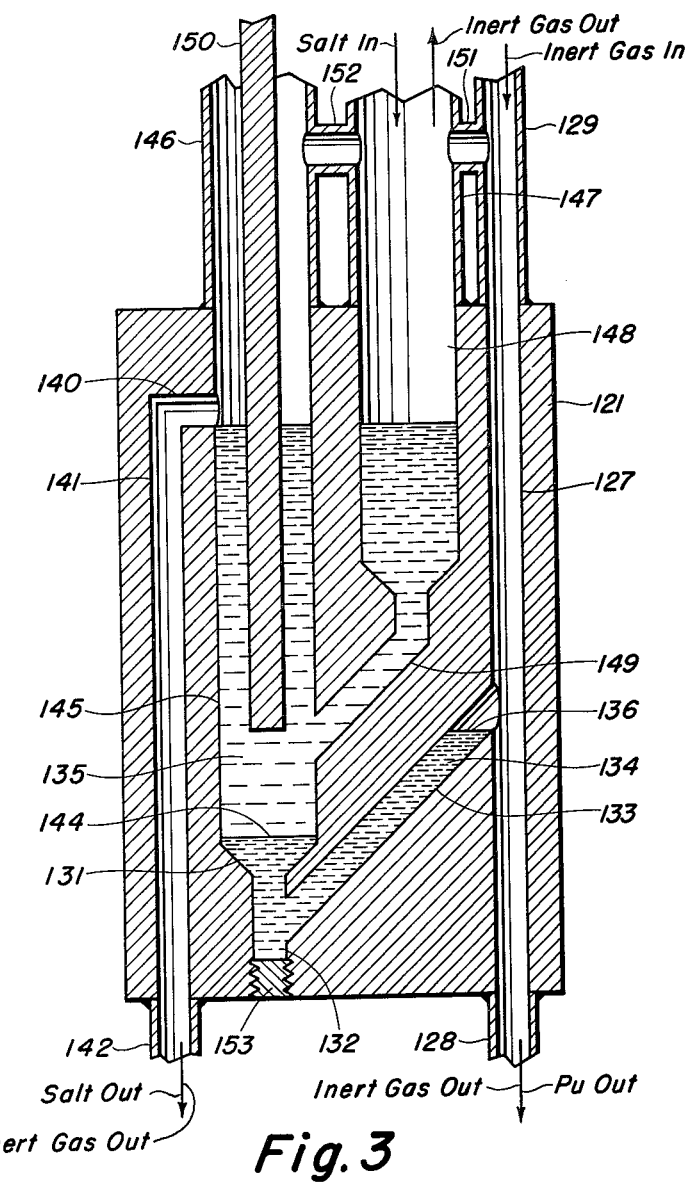

The method of the present invention can be more easily understood by referring to the attached drawings, of which:

FIGURE 1 illustrates apparatus suitable for conducting the processes of the present invention in a batchwise fashion, and was used with slight modifications in the work summarized in the examples below, FIGURE 2 shows an apparatus suitable for carrying on the same processes semi-continuously, and FIGURE 3 depicts apparatus in which the same processes may be carried on continuously.

Turning now to FIGURE 1, the general procedure is to charge the chloride or chlorides 1 in powder form into a suitable crucible 2. The crucible 2 is placed inside a furnace tube 3, which may be of a wall thickness no greater than that needed to withstand a vacuum and may, e.g., be of quartz for ready observation. The furnace tube 3 is sealed with a stopper 4 fitted with a thermocouple well 5, a tube 6 for connection to a vacuum pump and an argon supply system, and a tube 7 for the addition of calcium or other granular reductant, the thermocouple well 5 and reductant tube 7 extending down into the crucible. The reductant tube may be conveniently terminated on the outside in a ground glass joint 8 slanted from the vertical as shown, the other member of such joint being connected to an otherwise closed container 9 filled with granular reductant 10 and having the bent section indicated. By pivoting container 9 about joint 8, reductant 10 may be added at the will of the operator without affecting the atmosphere within the furnace tube. The crucible 2 is fitted with a tantalum lid 11 having appropriate openings for the reductant tube 7 and thermocouple well 5, and a number of smaller vapor openings as well. The purpose of lid 11 is to reduce losses of reactants and products from crucible 2 by spattering and volatilization.

With all of the above components installed as indicated, the furnace tube is evacuated of air, and heat is supplied to raise the temperature of the crucible contents rather slowly while vacuuming is continued. This is done to remove moisture and occluded gases from the reactants and the reaction vessel. When such temperature is between 200° C. and 450° C., argon is admitted to a pressure of about half an atmosphere to prevent volatilization or spattering of the salt in the crucible. This pressure is somewhat arbitrary and was selected to insure a tight connection at ground glass joint 8 (with atmospheric pressure outside) and also to insure against a too rapid increase in pressure within the reaction vessel during heating. With gastight seals at all openings and a relief valve in gas line 6, such precautions are unnecessary, and a pressure of about an atmosphere may be used throughout all heating. When the desired reduction temperature is reached, as indicated in more detail below, and before any reductant is added, the argon pressure is adjusted to a few centimeters of mercury below atmospheric. This pressure increase reduces the stress on the tube 3 by the atmospheric pressure on the outside, insures against air leakage into the tube, and prevents further spattering in the crucible as local high temperatures or "hot spots" may develop in the reactants and products.

In some cases the apparatus pictured in FIG. 1 was modified to permit introduction of the reductant as a solid rod. The reductant introduction tube was replaced by a molybdenum rod of small diameter which was used to suspend the rod of reductant. The temperature and pressure of the system were adjusted as outlined in preceding paragraphs before addition of the reductant. The bar of reductant was then lowered by pushing down the molybdenum rod to immerse the end of the reductant bar in the $PuCl_3$-containing salt. As the end of the bar was used up in the reaction, the bar was lowered further to add more reductant to the system. After an appropriate reaction time the reductant was withdrawn from the salt and the system was cooled.

The apparatus of FIGURE 1 defines a large gas volume above the reaction crucible, this volume extending, in the particular apparatus used, about 11 inches above the 4-inch high crucible in the 2-inch I.D. furnace tube. The large volume of gas acts as a cushion for the expansion of locally heated gas, i.e., the gas contacting the reactants and products. When the apparatus was used in the reductions of the examples below, no significant pressure increase occurred after the adjustment described above, i.e., the total pressure remained at about atmospheric during the reductant addition and thereafter. This large gas volume also served the practical purpose of insulating stopper 4 from the high temperature of the reaction zone. With a refractory type closure and the appropriate relief valve mentioned above, such volume can be reduced considerably.

Using the above described apparatus and generally described method, two attempts were made to reduce $PuCl_3$ in a $PuCl_3$—NaCl mixture by gradual addition of small pieces of Mg to the molten salt mixture in a quartz crucible. In both cases the yield of Pu metal was too low to be acceptable (less than 50%).

A number of calcium reductions were made using both pure $PuCl_3$ and $PuCl_3$—NaCl mixtures, and using each type of salt in both tantalum crucibles and in ceramic crucibles composed of 10 percent by weight (w/o) of $TiO_2$, balance MgO. In each case, a 25 percent molar excess of granular Ca was used as the reductant. Also in each case, the plutonium chloride was prepared from plutonium metal of about 99.9 percent purity. Four reductions of $PuCl_3$ from $PuCl_3$—NaCl mixtures were made by dipping lanthanum rods into the molten salt contained in MgO—10 w/o $TiO_2$ crucibles, the total amount of La present in each reduction being in large excess of the amount needed for complete reduction of the $PuCl_3$. After the reaction had proceeded for the desired length of time, the excess La was withdrawn to break contact with the salt.

Specific examples of the above methods and results follow:

(1) Ca *Reduction, Tantalum Crucible, Undiluted* $PuCl_3$

After reaching a steady temperature of 773° C. as indicated by a thermocouple junction at the bottom of the well, the calcium was added at the rate of 0.5 to 1.0 gram per minute. The maximum temperature observed during the Ca addition was 850° C. because of the exothermic nature of the reaction. At the end of such addition, the temperature of the reaction products was 803° C. Heating was discontinued and the contents of the crucible were allowed to cool to room temperature. The bulk of the slag was removed mechanically, and the balance by leaching with dilute $HNO_3$.

The plutonium metal in the crucible presented a smooth, dense surface, and was removed by dissolution in dilute HCl. The metal contained about 0.1 weight percent Ca, 0.02 weight percent Ta, and the balance essentially plutonium (>98.5 w./o.). The yield from a starting weight of plutonium in the chloride of 25.02 grams was 99.9 percent. The slag contained 0.06 weight percent $PuCl_3$ and accounted for 0.03 percent of the starting weight of plutonium.

(2) Ca *Reduction,* MgO—$TiO_2$ *Crucible, Undiluted* $PuCl_3$

The first calcium was added to a quantity of fused $PuCl_3$ containing 16.65 grams of plutonium in the crucible after the argon pressure had been adjusted to a few centimeters less than atmospheric at a steady temperature of 757° C. The calcium addition was continued at the rate of 0.5–1.0 gram per minute until the 25 percent molar excess had been added, during which time the temperature in the crucible rose to 785° C. Since previous reductions had indicated the necessity for a further increase in temperature to obtain a smooth, mechanically separable Pu regulus when using the oxide crucible, the furnace heating rate was increased to raise the crucible temperature to 850° C. At this point the furnace was shut off, and the tube and contents were allowed to cool to room temperature.

The ceramic crucible was broken open, and the metal button and solidified slag were mechanically separated. The plutonium was leached with dilute $HNO_3$ to remove adhering slag and calcium, after which it was dried, weighed, and dissolved in dilute HCl for analysis. The separated slag was similarly weighed and dissolved in dilute $HNO_3$ for analysis.

The results of the analyses indicated a 95 percent plutonium yield, with 4 weight percent of the slag consisting of $PuCl_3$ and accounting for 2 percent of the starting plutonium (the balance presumably appearing in the crucible). The plutonium button was found to contain less than 0.03 weight percent Ca, the balance being essentially all Pu, i.e., Pu >99.0 weight percent.

(3) Ca Reduction, Ceramic Crucible, 80 w/o PuCl₃—20 w/o NaCl Salt

The mixed salts contained 9.35 grams of plutonium. Calcium addition was commenced at 575° C. and continued through a crucible temperature rise to 590° C. at the rate of 0.5–1.0 gram per minute. The heating rate was increased until the crucible temperature rose to 850° C., after which the furnace was shut off and the tube and contents were cooled to room temperature.

The products were separated for analysis as in Example 2, again yielding a dense plutonium button. The analyses indicated a plutonium yield of 98.5 percent, with the slag consisting of 0.07 weight percent PuCl₃ and accounting for 0.5 percent of the starting plutonium. The metal button contained 0.02 weight percent Mg, 0.01 weight percent Ca, 0.10 weight percent Ti, balance essentially pure plutonium (>99.0 weight percent).

(4) Ca Reduction, Ta Crucible, 80 w/o PuCl₃—20 w/o NaCl Salt

The mixed salts contained 13.43 grams of plutonium. Calcium was added at the rate of 0.5–1.0 gram per minute in the range of 700–715° C. It was found that a dense pool of molten plutonium forms at 715° C. and that heating to a higher temperature is unnecessary. The furnace was shut down at 715° C. and the products cooled to room temperature.

The crucible contents were removed as in Example 1, disclosing a smooth, dense plutonium button. The metal and slag were weighed and analyzed to indicate a plutonium yield of 98.5 weight percent, with 0.05 percent of the starting plutonium appearing in the slag. The metal contained about 0.10 weight percent Ca and 0.02 weight percent Ta, balance essentially pure plutonium (>99.0 weight percent).

(5) Ca Reduction, Ceramic Crucible—Contaminated Salt

The same type of MgO—10 weight percent TiO₂ crucible as in Example 3 was used, but the salt mixture contained 5 weight percent mixed rare earth chlorides, 19 weight percent NaCl and 76 weight percent PuCl₃. Following the same procedure of adding calcium slowly when the argon pressure is slightly less than atmospheric, the addition was started at 520° C. and continued to 565° C. The crucible temperature was raised to 860° C., after which the furnace was shut down and the tube allowed to cool to room temperature.

Upon separating and analyzing the products in the usual manner, it was found that the plutonium yield was 99 percent, the PuCl₃ concentration in the slag being 0.4 weight percent and accounting for 0.45 percent of the starting plutonium. However, the plutonium button analysis revealed that virtually all of the rare earth chlorides had been coreduced with the PuCl₃, and accounted for an appreciable fraction of the weight of the button.

The work summarized in the above examples was also repeated with decreasing molar excesses of calcium. This further work indicated that a 15 percent molar excess of calcium is required to insure a plutonium yield exceeding 90 percent, and that at least a 20 percent calcium excess is necessary to obtain the high plutonium yields of the examples, i.e., 95 to 99.9 percent.

(6) La Reduction, Ceramic Crucible, PuCl₃—NaCl Salt

The lanthanum reductant was added to a fused salt melt consisting of 79 weight percent PuCl₃ and 21 weight percent NaCl after the latter had been raised to a temperature of 700° C. and the argon pressure above the crucible had reached atmospheric pressure. The lanthanum was in the form of a rod of 0.5 cm.² cross sectional area, the addition being accomplished by lowering the La rod into the melt from a ⅛-inch diameter molybdenum suspension rod passing through the stopper of the furnace tube. As the end of the La rod was consumed during the reaction, the balance of the rod was lowered to add fresh reductant to the melt. The amount of La thus contacted was in large excess of the stoichiometric amount for the complete reduction of the PuCl₃.

After 25 minutes at 700° C., during which not more than a 10° C. rise because of exothermic reaction was observed, the La rod was withdrawn and heating was discontinued. The cooled crucible was broken open to reveal a well formed plutonium button. Upon separation of the metal from the slag and subsequent analysis, it appeared that the yield of Pu was 91 percent from a starting weight of 13.64 grams in the trichloride. The concentration of La in the metal was less than 0.007 weight percent, and the concentration of PuCl₃ in the slag was 7.0 weight percent.

(7) La Reduction, Ceramic Crucible, PuCl₃—NaCl Salt

Example 6 was repeated, the only difference being that the composition of the salt phase was 80 weight percent PuCl₃—20 weight percent NaCl, the weight of the combined Pu being 20.07 grams.

In this instance the yield of plutonium in a well formed button was 90 percent, the concentration of the lanthanum therein being 0.27 weight percent. The concentration of the PuCl₃ in the slag was 6.0 weight percent.

(8) La Reduction, Ceramic Crucible, PuCl₃—NaCl—CeCl₃ Salt

The procedure of Example 6 was again followed except that the reaction was continued for 35 minutes at 700° C. and 1 atmosphere of argon. The salt composition was 77 weight percent PuCl₃, 19.5 weight percent NaCl and 3.5 weight percent CeCl₃, with 15.26 grams Pu and 0.56 gram Ce in the Chlorides.

Again a well formed massive metal was obtained, assaying 0.09 weight percent La and 0.38 weight percent Ce. The plutonium yield was 94 percent, and the concentration of PuCl₃ in the slag was 1.5 weight percent.

(9) La Reduction, Ceramic Crucible, PuCl₃—NaCl—CeCl₃ Salt

Example 8 was repeated with a salt melt of composition 78 weight percent PuCl₃—19.7 weight percent NaCl—2.3 weight percent CeCl₃ containing 17.37 grams Pu and 0.41 gram Ce in the chlorides. The Pu yield was 95 percent, and the metal was found to contain 0.17 weight percent La and 0.09 weight percent Ce. The concentration of PuCl₃ in the slag was 1.4 weight percent.

FIGURE 2 illustrates an apparatus suitable for practicing the present invention on a semi-continuous basis. This apparatus consists essentially of a number of tubes, preferably of tantalum or other non-reactive metal, disposed in registering and sealing relationship with a number of cylindrical cavities in a block 21 of non-reactive metal which does not alloy with plutonium, e.g., tantalum, the latter being disposed in a furnace or being provided with heaters inserted in appropriate cavities (not shown). Thus the reaction chamber 22 registers in sealing relationship with the tube 23, the latter extending above block 21 to provide a gas volume as in FIGURE 1 and fitted at the top with a closure (not shown) provided with appropriate passages for salt addition tube 24, metal addition tube 25, stirrer shaft 26 and any auxiliary devices used, e.g., a thermocouple well.

Through passage 27 in block 21 registers with plutonium outlet tube 28 at the bottom of the block and the inert gas inlet tube 29 at the top, the latter tube being connected to furnace tube 23 by one or more cross tubes 30. Reaction chamber 22 is tapered at its lower end 31 as shown and is connected through the small vertical cavity 32 and the diagonal riser cavity 33 to through cavity 27, this arrangement being generally known as an "overflow weir." By this arrangement liquid plutonium 34 can drain through the lower end of cavity 27 and out through tube 28, but the inert gas pressure at the maximum plutonium level 36 is always equal to that at the top of the melt 37, thereby preventing a siphoning action which could remove all of the liquid plutonium 34 and the melt 35 if no such arrangement were provided.

The stopper rod 39 operates slidably and sealingly in cavity 38 to block any possible flow from reaction chamber 22 through cavity 40 to the smaller bore salt drainage cavity 41 and salt drainage tube 42, as shown. Stirrer 43 is provided to agitate the melt and insure rapid contact between the $PuCl_3$ and the calcium, lanthanum or other metal reductant. This is highly desirable because freshly added reactants do not immediately form a uniform dispersion throughout the reaction zone. Calcium, for instance, will float on the surface 37 of melt 35, while freshly added $PuCl_3$ granules tend to sink in a melt of $CaCl_2$ or $LaCl_3$ and NaCl. Although the liquid forms of these salts, including any NaCl, are completely miscible at the operating temperature and eventually will form uniform solutions in which the $PuCl_3$ will be reduced to form Pu and $CaCl_2$ or $LaCl_3$, the reduction will be considerably hastened by the agitating action of stirrer 43.

In a starting up operation, stopper rod 39 is placed in the closed position shown, the system is purged, and an inert gas such as argon or helium is admitted from the top of tube 29. It is preferable to maintain the inert gas pressure within the device at a slightly higher pressure than that on the outside, to insure against air or oxygen leaks into the apparatus. This is most easily accomplished by pumping purified argon in through tube 29 and permitting it to leak out through plutonium exit tube 28 and either or both the salt addition tube 24 and the reductant addition tube 25. The effluent gas may, of course, be collected and re-purified. Such a system may be made continuous by old and well known methods. The flowing gas contributes the further advantage of carrying off some of the exothermic heat and makes it possible to reduce the large gas volume mentioned above.

$PuCl_3$ (and NaCl) may then be added in powder form through tube 24, followed by heating and then gradual additions of calcium through tube 25, or the apparatus may first be heated to the reaction temperature and the salts and the reductant may be gradually added, simultaneously or separately. These additions may be accomplished through means not shown similar to the reductant addition tube 9 of FIGURE 1, the latter being modified to provide a passage for the exit of the argon.

Some amount of care must be exercised in determining the weight and volume of the initial charge to prevent the escape of unreacted $PuCl_3$ through tube 28, e.g., if only the salts are melted first, the charge must be calculated to keep the liquid level in the reaction chamber 22 no higher than the maximum plutonium level 36. When the initial charge has reacted and the dense liquid plutonium has collected in the diagonal riser 33 and vertical cavity 32, the plutonium level in 33 will fall below the level of the fused salts in reaction chamber 22, the difference in height depending on the relative densities of the two liquid phases in a well known and calculable manner.

Thereafter more of the reactant salt, with or without the NaCl diluent, and more of the metal reductant may be added. Either the salts may be added batchwise, followed by gradual additions of the metal, or both may be added gradually at about the same time. The latter is preferred because it brings the reactants into contact with one another more quickly than the batchwise additions. The stirrer 43 is activated to further promote a rapid reduction.

As the additions proceed and more products are formed, the level of the salt phase and the two levels of the plutonium phase rise until plutonium begins to drip over from diagonal riser 33 into cavity 27, through which it falls into outlet tube 28. As more raw materials are added and the reaction continues, the overflow and collection of such plutonium continues. Since the salt continues to accumulate as plutonium is being removed, level 37 continues to rise while the plutonium level in riser 33 remains fixed at its maximum 36, the result being a lowering of the salt-plutonium interface 44. By taking into account the densities of the two phases and the maximum safe plutonium accumulation consonant with non-criticality, the maximum salt height prior to drainage is readily determined.

When the salt has accumulated to a level 37 such as shown in FIGURE 2, and the reduction of the $PuCl_3$ is complete, stopper rod 39 is raised to permit the salt to discharge through cavities 40 and 41 and tube 42. The discharge of plutonium temporarily ceases, as the level in riser 33 adjusts to a value lower than the maximum 36. No plutonium metal can follow the outgoing salt, as the location of cavity 40 is higher than the maximum plutonium level 36, i.e., the intersection of riser 33 and cavity 27. There can be no pumping action to force out any liquid below the lower wall defining cavity 40 because of the equal gas pressures above such liquid and above the plutonium in riser 33.

The above described salt drainage is, of course, accomplished very quickly. Immediately thereafter the stopper rod is lowered to the closing position, and the additions of raw materials are recommenced. Although the salt discharge is batchwise, the flow of plutonium, the product for which the structure was devised, is halted for only a few seconds out of every 15 minutes or so. Thus the apparatus of FIGURE 2 provides a means for obtaining substantially a continuous reduction of the plutonium halide to the metal.

FIGURE 3 illustrates an apparatus similar in most respects to the embodiment of FIGURE 2, analogous parts being designated by the same numerals prefixed by the digit "1" to form a 100 series. Thus the tantalum block 121, through cavity 127, plutonium exit tube 128, inert gas inlet tube 129, frusto-conical cavity 131, vertical cavity 132, diagonal riser 133, liquid plutonium 134, salt melt 135, maximum plutonium level 136, horizontal cavity 140, salt drainage cavity 141, salt drainage tube 142 and salt-plutonium interface 144 correspond to the parts of FIGURE 2 numbered in the sub-one-hundred series, as above mentioned, and are similarly disposed. The major differences are that in FIGURE 3 a smaller bore reaction chamber 145 and correspondingly smaller co-axial and sealingly registering furnace tube 146 are provided, salt addition tube 147 is joined in sealing and registering relationship with a corresponding cavity 148 in tantalum block 121, such cavity 148 is connected to the lower part of reaction chamber 145 by passage 149 (not necessarily diagonal as shown), and the reducing metal is in the form of a rod 150 suspended in the salt melt 135 by a supporting structure at the top of furnace tube 146 (not shown). This structure may include suitable means for lowering rod 150 into the melt as it is consumed.

There is no stopper rod in the FIGURE 3 embodiment, but the horizontal salt drainage cavity 140 is disposed at a higher location in reaction chamber 145, and the vertical salt drainage cavity 141 is correspondingly longer than, the corresponding elements of the FIGURE 2 embodiment. Cross tubes 151 and 152 permit the flow of the inert gas introduced through 129 into tubes 146 and 147 to equalize the pressures therein with the pressure exerted on the surface of the plutonium in riser 133. The long length of reducing metal rod 150 immersed in salt melt 135 insures adequate surface for the reduction reaction. Element 153 is a tantalum plug, removable for drainage purposes during shutdown.

While it is apparent that the FIGURE 3 embodiment may be operated in a manner similar to that of the FIGURE 2 apparatus, i.e., adding the salts as granules and melting them in the reaction chamber 145 and cavity 148, the preferred method of operation is by the introduction of the salt composition to be used as a liquid phase.

Thus the liquid salt phase added through 147 is most conveniently the end product of the process disclosed in the patent issued to Reavis et al., U.S. Pat. 2,886,410. That patent discloses a process by which a partially spent plutonium fuel displaces the zinc in a chloride melt to form a melt of PuCl₃ and NaCl, at the same time stripping a number of fission products from the plutonium by preferential dissolution and distillation. Since that process may be carried on continuously and since one of the overall objectives of the present invention is the development of a continuous process for the purification (decontamination) of such plutonium fuels, the end product of that process is piped into the tube 147 as a liquid. Otherwise the operation of the FIGURE 3 embodiment is the same as the operation of the FIGURE 2 embodiment, except that the rate of rise of the salt phase in reaction chamber 145 must be more carefully controlled to insure a maximum reduction of the PuCl₃ by the reductant rod 150.

In considering the minimum and optimum operating temperatures for the reductions exemplified above and illustrated as adaptable for semi-continuous and continuous operation with the apparatus embodiments of FIGURES 2 and 3, respectively, it is apparent that a number of factors must be considered. In each process the minimum temperature must exceed the melting point of plutonium (640° C.) to obtain a well consolidated metal product, and must also exceed the melting points of both the reactant salt and the product salt. These melting points, for the pure undiluted salts, are, in degrees Celsius:

| | |
|---|---|
| $PuCl_3$ | 770 |
| $CaCl_2$ | 772 |
| $LaCl_3$ | 870 |

When the PuCl₃ is diluted with NaCl, the melting points of the reactant salt and the product salt are reduced. Each of the three systems discussed has a simple eutectic type of phase diagram with no compound formation, the eutectic points being approximately:

| Composition: | Temperatures, °C. |
|---|---|
| 77 w/o PuCl₃—23 w/o NaCl | 453 |
| 66 w/o LaCl₃—34 w/o NaCl | 543 |
| 67 w/o CaCl₂—33 w/o NaCl | 505 |

(Pure NaCl melts at about 800° C.)

Another factor to be considered is the material of the reaction crucible for the particular reaction. As indicated in Examples 2, 3 and 5, it was necessary to raise the reaction temperature to about 825–850° C., in making calcium reductions in a ceramic crucible to obtain a well formed reduction button. No explanation for such required temperature increase is apparent, and no necessity therefor appeared in the calcium reductions in a tantalum crucible or in the lanthanum reductions in a ceramic crucible. With the former, massive metal was produced at about 800° C. from undiluted PuCl₃ and at 700–715° C. from the mixed salts of approximately eutectic composition (20 w/o NaCl). The lanthanum reductions of salts of the same composition also yielded good metal at about 700° C. No La reductions of undiluted PuCl₃ were made because it was desired to keep the reductant rod in the solid phase.

When the apparatus of FIGURE 3 is used for a continuous reduction process, it is desirable that the reductant rod remain in the solid phase. To insure such condition, the fused salts should be maintained at a temperature below the melting point of calcium (about 850° C.) or lanthanum (about 825° C.), whichever is employed. For a batch process or for semi-continuous operation, the operating temperature may be high enough to permit melting of the reductant.

In considering optimum temperatures and times, it is apparent that little would be gained by increasing the reaction temperature for the calcium reductions above those indicated supra because the yields and the quality of the reduced metal are quite satisfactory. The time at reaction temperature poses no problem, as the attainment of a steady temperature after completion of a rapid exothermic excursion indicates completion of the reaction. With lanthanum reductions, no readily apparent exotherm occurs, and a comparison of Examples 6 and 7 with 8 and 9 indicates an increase in yield with an increase in reaction time. It is also possible that the yield may be increased by raising the temperature of the reaction.

Examples 8 and 9 demonstrate a significant decrease in the cerium to plutonium ratio in the lanthanum reductions. Thermodynamic calculations indicate that lanthanum will likewise reduce PuCl₃ much more readily than the chlorides of the other rare earths. Thermodynamic calculations also indicate that if conditions of the reduction are changed so that a few percent of the PuCl₃ remains in the salt after contact with the reductant, the concentration of rare earth contaminants in the metal product will be lower than with complete reduction of the PuCl₃. Thus it is indicated that at the expense of plutonium yield, greater decontamination from rare earth impurities may be achieved. In the reduction with lanthanum incomplete reduction may be achieved by shorter contact times between the lanthanum and the salt or by limiting the amount of lanthanum added to an amount insufficient to reduce all the PuCl₃ present.

What is claimed is:

1. A process for obtaining plutonium metal at atmospheric pressure without the use of a booster, comprising melting a reactant salt containing plutonium trichloride in a refractory, non-reactive crucible under an inert gas blanket of large volume maintained during said process at about atmospheric pressure and not more than slightly greater than atmospheric, gradually contacting said melted reactant salt with an excess of a reductant selected from the class consisting of calcium and lanthanum, increasing the temperature of the reactants as necessary to at least a value exceeding the melting points of plutonium metal and the resulting product salt and to such higher value required to permit consolidation of the resulting plutonium metal, maintaining said temperature for a sufficient time to allow said reduction reaction to reach equilibrium, and thereafter discontinuing heating and permitting the contents of said crucible to cool to room temperature.

2. The process of claim 1 in which said reactant salt is undiluted plutonium trichloride, said crucible material is tantalum, said reductant is calcium in an excess of at least 20 percent and said higher temperature is about 800° C.

3. The process of claim 1 in which said reactant salt is undiluted plutonium trichloride, said crucible material is a binary oxide consisting essentially of about 10 weight percent titanium oxide, balance magnesium oxide, said reductant is calcium in an excess of at least 20 percent and said higher temperature is about 825–850° C.

4. The process of claim 1 in which said reactant salt is plutonium trichloride diluted with sodium chloride to reduce the melting point of said reactant salt, said crucible material is a binary oxide consisting essentially of 10 weight percent titanium oxide and the balance magnesium oxide, said reductant is calcium in an excess of at least 20 percent, and said higher temperature is about 850° C.

5. The process of claim 4 in which said sodium chloride is about 20 weight percent of said reactant salt.

6. The process of claim 1 in which said reactant salt is plutonium trichloride diluted with sodium chloride to reduce the melting point of said reactant salt, said crucible material is tantalum, said reductant is calcium in an excess of at least 20 percent, and said higher temperature is from 700 to 715° C.

7. The process of claim 1 in which said reductant is lanthanum.

8. The process of claim 7 in which said reactant salt is plutonium trichloride diluted with sodium chloride.

9. The process of claim 8 in which said sodium chloride is about 20 weight percent of said reactant salt.

10. The process of claim 9 in which said crucible material consists essentially of 10 weight percent titanium oxide, balance magnesium oxide, and said higher temperature is about 700° C.

11. The process of claim 10 in which said time at said higher temperature is a minimum of 25 to 35 minutes.

12. The process of claim 11 in which said lanthanum reductant is in the form of a rod immersed in said melted reactant salt.

13. The process of claim 7 in which said reactant salt includes chlorides of the rare earth metals.

References Cited in the file of this patent

UNITED STATES PATENTS

| | | |
|---|---|---|
| 2,756,043 | Fleiszar et al. | July 24, 1956 |
| 2,758,831 | Winter | Aug. 14, 1956 |
| 2,886,429 | Cooke et al. | May 12, 1959 |
| 2,890,110 | Baker | June 9, 1959 |
| 2,899,298 | Anicetti | Aug. 11, 1959 |
| 2,908,563 | Weissman et al. | Oct. 13, 1959 |